United States Patent
Wu et al.

(10) Patent No.: US 11,398,931 B2
(45) Date of Patent: Jul. 26, 2022

(54) INTERFERENCE MITIGATION IN HIGH SPEED ETHERNET COMMUNICATION NETWORKS

(71) Applicant: Marvell Asia Pte, Ltd., Singapore (SG)

(72) Inventors: Xing Wu, Palo Alto, CA (US); Yuansheng Jin, Santa Clara, CA (US); Junyi Xu, Fremont, CA (US); Jian-Hung Lin, Laguna Niguel, CA (US); Shaoan Dai, San Jose, CA (US)

(73) Assignee: Marvell Asia Pte Ltd, Singapore (SG)

( * ) Notice: Subject to any disclaimer, the term of this patent is extended or adjusted under 35 U.S.C. 154(b) by 0 days.

(21) Appl. No.: 17/146,441

(22) Filed: Jan. 11, 2021

(65) Prior Publication Data
US 2021/0218604 A1    Jul. 15, 2021

Related U.S. Application Data

(60) Provisional application No. 62/959,666, filed on Jan. 10, 2020.

(51) Int. Cl.
*H04L 25/03*    (2006.01)

(52) U.S. Cl.
CPC .. *H04L 25/03031* (2013.01); *H04L 25/03146* (2013.01); *H04L 25/03267* (2013.01); *H04L 25/03885* (2013.01); *H04L 2025/0349* (2013.01); *H04L 2025/03617* (2013.01)

(58) Field of Classification Search
CPC ......... H04L 25/03146; H04L 25/03885; H04L 2025/0349; H04L 25/03267; H04L 2025/03617; H04L 25/03019; H04L 25/03031

USPC .................. 375/219, 229–233, 316
See application file for complete search history.

(56) References Cited

U.S. PATENT DOCUMENTS

| | | | | |
|---|---|---|---|---|
| 7,613,991 | B1* | 11/2009 | Bain | H03M 13/091 714/807 |
| 7,697,603 | B1* | 4/2010 | Wang | H04L 25/03057 381/103 |
| 9,455,848 | B1* | 9/2016 | Zhang | H04L 7/0062 |
| 9,716,529 | B1 | 7/2017 | Dai et al. | |
| 9,838,072 | B1* | 12/2017 | Dai | H04L 25/03885 |

(Continued)

OTHER PUBLICATIONS

International Search Report and Written Opinion in International Patent Application No. PCT/US2021/012993, dated Apr. 26, 2021 (14 pages).

(Continued)

*Primary Examiner* — Emmanuel Bayard (57) ABSTRACT

Data symbols in an input signal are detected with a slicer of a DFE of a transceiver device. An output of a feedback filter of the DFE is generated, during a particular clock cycle, based on a first set of one or more data symbols detected during first one or more previous clock cycles and a second set of one or more data symbols detected during second one or more previous clock cycles. The second set is separated from the first set by a third set of one or more data symbols detected during third one or more clock cycles that occur after the first one or more clock cycles and before the second one or more clock cycles, where the output is generated without use of the third set of symbols. The output is subtracted from the input signal to generate an equalized input to the slicer.

20 Claims, 7 Drawing Sheets

(56) References Cited

U.S. PATENT DOCUMENTS

| | | | |
|---|---|---|---|
| 10,038,575 B1* | 7/2018 | Steffan | H04L 27/01 |
| 10,044,406 B1 | 8/2018 | Dai et al. | |
| 2008/0049825 A1 | 2/2008 | Chen et al. | |
| 2013/0039407 A1 | 2/2013 | Aziz et al. | |
| 2013/0121396 A1* | 5/2013 | Huang | H04L 25/03057 |
| | | | 375/233 |
| 2013/0230093 A1* | 9/2013 | Aziz | H04L 25/14 |
| | | | 375/233 |
| 2014/0056345 A1* | 2/2014 | Dickson | H04L 25/03057 |
| | | | 375/233 |
| 2014/0192935 A1* | 7/2014 | Palusa | H04L 7/0087 |
| | | | 375/340 |
| 2016/0149656 A1* | 5/2016 | Levin | H04B 17/29 |
| | | | 375/224 |
| 2016/0173300 A1* | 6/2016 | Laufer | H04L 25/03885 |
| | | | 375/233 |
| 2017/0185387 A1* | 6/2017 | Chandler | G06F 9/38 |
| 2018/0006848 A1 | 1/2018 | Johnson et al. | |

OTHER PUBLICATIONS

IEEE Std. 802.3ch™-2020, "IEEE Standard for Ethernet Amendment 8: Physical Layer Specifications and Managemetn Parameters for 2.5 Gb/s, 5 Gb/s, and 10 Gb/s Automotive Electrical Ethernet," IEEE Computer Society, 207 pages (Jun. 4, 2020).

IEEE Std. 802.3™-2018, "IEEE Standard for Ethernet," IEEE Computer Society, 5600 pages (Jun. 24, 2018).

IEEE Std 802.Mar. 2002, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, 379 pages (Mar. 8, 2002).

IEEE Std 802.Mar. 2005, "IEEE Standard for Information technology—Telecommunications and information exchange between systems—Local and metropolitan area networks—Specific requirements, Part 3: Carrier sense multiple access with collision detection (CSMA/CD) access method and physical layer specifications," *The Institute of Electrical and Electronics Engineers, Inc.*, Sections 1-5, 2695 pages (Dec. 9, 2005).

IEEE Draft P802.3ae/D5.0 Supplement to Carrier Sense Multiple Access with Collision Detection (CSMA/CD) Access Method & Physical Layer Specifications—Media Access Control (MAC) Parameters, Physical Layer, and Management Parameters for 10 Gb/s Operation *The Institute of Electrical and Electronics Engineers, Inc.*, 540 pages (May 1, 2002).

Chen, "Home Network Basis: Transmission Environments and Wired/Wireless Protocols," Prentice Hall, 26 pages (2006).

IEEE Std. 802.3bp™/D1.5, "Draft Standard for Ethernet Amendment: Physical Layer Specifications and Management Parameters for 1Gb/s Operation over a Single Twisted Pair Copper Cable," *The Institute of Electrical and Electronics Engineers, Inc.*, 202 pages (Jun. 14, 2015).

IEEE Std. 802.3bp™-2016, "IEEE Standard for Ethernet—Amendment 4: Physical Layer Specifications and Management Parameters for 1Gb/s Operation over a Single Twisted Pair Copper Cable," *The Institute of Electrical and Electronics Engineers, Inc.*, 211 pages (Jun. 30, 2016).

Parhi, *VLSI Digital Signal Processing Systems, Design and Implementation*, Chap. 5, pp. 119-148, John Wiley & Sons (1999).

* cited by examiner

INTERFERENCE MITIGATION IN HIGH SPEED ETHERNET COMMUNICATION NETWORKS

CROSS REFERENCES TO RELATED APPLICATIONS

This application claims the benefit of U.S. Provisional Patent Application No. 62/959,666, entitled "Digital Signal Processor (DSP) Electromagnetic Interference (EMI) Mitigation on High Speed Automotive PHYs," filed on Jan. 10, 2020, which is hereby incorporated herein by reference in its entirety.

FIELD OF TECHNOLOGY

The present disclosure relates generally to Ethernet communication systems, and more particularly to mitigating interference in high speed Ethernet communication systems.

BACKGROUND

Modern vehicles, such as advanced automobiles, often use Ethernet technologies to connect components over a wired physical network within the vehicle. The automotive Ethernet networks have been evolving to improve transmission speed supported by the networks. For example, "100 Base-T1" Ethernet specified by the Institute for Electrical and Electronics Engineers (IEEE) 802.3bw Standard supports transmission speed of 100 Megabits per second (Mbps), and the "1000 Base-T1" Ethernet specified by the IEEE 802.3 bp Standard supports transmission speed of 1 Giga bits per second (1 Gbps) transmission speed. A more recent IEEE 802.3ch Base-T1 Standard supports 2.5 Gbps, 5 Gbps and 10 G Gbps transmission speeds. Also, other alliances, such as the Mobile Industry Processor Interface (MIPI) alliance and Automotive SerDes Alliance are now working on automotive Ethernet solutions that will support up to 16 Gbps transmission speed.

Automotive Ethernet applications face stringent requirements to ensure safe operation in diverse environments often seen in automotive employments. One important requirement in automotive applications is Electromagnetic Compatibility (EMC), or the ability of devices and systems to operate in their electromagnetic environment without impairing their functions and without faults. For example, an Ethernet network in a vehicle needs to function properly in presence of strong electromagnet interference (EMI), such as in the presence of cellular phone signals, lightning and electromagnetic discharge (ESD) events, and the like. Meeting such stringent requirements, however, becomes difficult with the increasing transmission speeds supported by the automotive networks. For example, although a decision feedback equalizer (DFE) may be employed to mitigate electromagnetic interference in a receiver device, current DFE designs cannot support the increasing transmission speeds of automotive networks.

SUMMARY

In an embodiment, a transceiver device for use in an automotive Ethernet network. The transceiver device comprises: an equalizer configured to mitigate interference in an input signal received by the transceiver device, the equalizer including a decision feedback equalizer (DFE) including a slicer configured to detect data symbols in the input signal, a feedback filter configured to, during a particular clock cycle, generate a filter output based on i) a first set of one or more data symbols detected by the slicer during first one or more previous clock cycles and ii) a second set of one or more data symbols detected by the slicer during second one or more second previous clock cycles, wherein the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols, and a summing junction configured to subtract the filter output from the input signal to generate an equalized input to the slicer.

In another embodiment, a method for mitigating interference in signals received by a transceiver device in an automotive Ethernet network. The method includes: receiving an input signal at an equalizer of the transceiver device, the equalizer including a decision feedback equalizer (DFE); detecting, with a slicer of the DFE, data symbols in the input signal; generating a filter output at a feedback filter of the DFE, the filter output being generated, during a particular clock cycle, based on i) a first set of one or more data symbols detected by the slicer during first one or more previous clock cycles and ii) a second set of one or more data symbols detected by the slicer during second one or more previous clock cycles, wherein the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols; and subtracting the filter output from the input signal to generate an equalized input to the slicer.

DETAILED DESCRIPTION

In embodiments described below, a decision feedback equalizer (DFE) supports operation (e.g., filtering and channel equalization) in high speed networks, such as, for example, Multi-Gig Ethernet automotive networks. In an embodiment, the DFE is used in combination with a forward feeding equalizer (FFE) to mitigate interference from a received signal that traveled through a communication channel. As explained in more detail below, in an embodiment, the FFE/DFE combination detects presence of narrow band interference in the received signal. In response to detecting the interferences, the FFE adapts its filter coefficients to generate a notch filter to remove the detected interference from the signal. Further, the DFE adapts its coefficients to counter the effects of the notch filter generated by the FFE to enable the equalizer to accurately detect transmitted symbols based on the received signal.

Generally, a DFE includes a slicer and a feedback filter. The slicer is configured to identify transmitted symbols based on samples of a received signal. The feedback filter utilizes previous decisions made by the slicer (e.g., during previous clock cycles) to calculate a filter output to be applied to the input signal presented to the DFE during the current clock cycle. The feedback filter comprises a plurality of filter taps, each filter tap corresponding to a particular previously detected symbol, the feedback filter being used to calculate a weighted contribution from the particular previously detected symbol. Current DFEs typically cannot operate at high speeds (e.g., greater than 1 GHz speeds) because current DFE designs at high speeds cannot sufficiently close timing, in a single clock cycle, to feed symbols detected in previous clock cycles back to the feedback filter, and to perform calculations needed to generate the filter output for the current clock cycle by the feedback filter. With current DFEs, digital logic/data paths of up to approximately 1 GHz are possible. Some such current DFEs utilize parallel DFE paths combined with "look-ahead/unrolling" implementations of one or more filter taps to enable operation at the higher (e.g., 1 GHz) speeds. Such current DFEs, however, cannot handle multi-GHz symbol baud rate of a transceiver device, such as 5.625 GHz used in 10GBASE-T1 Ethernet, for example. Moreover, with current DFEs, hardware complexity of "look-ahead/unrolling" implementations grows exponentially with higher modulation orders (e.g., PAM4 modulation used in 10GBASE-T1 Ethernet, particularly in systems in which multiple parallel DFE paths are utilized, making such implementations impossible or prohibitively costly (e.g., in terms of silicon area, power consumption, chip cost, etc.).

To enable operation of the DFE at sufficiently high speeds, in embodiments described below, a set of one or more filter taps of a feedback filter of the DFE are not implemented as traditional filter taps. For example, the one or more filter taps are effectively forced to be "zero" filter taps, such that this set of one or more filter taps is not used for generating a filter output during a current clock cycle. Thus, in an embodiment, during a particular clock cycle, the feedback filter generates a filter output based on i) a first set of one or more data symbols detected by the slicer during first one or more previous clock cycles and ii) a second set of one or more data symbols detected by the slicer during second one or more previous clock cycles. In an embodiment, the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols. As explained in more detail below, such "zeroing out" of filter taps eases timing constraints for the following filter taps that are used in generating the filter output in the current clock cycle, thereby allowing for the DFE to support operating at higher speeds than possible in traditional DFEs in which all filter taps are implemented and used for generating the filter output during a current clock cycle.

Figure 1:
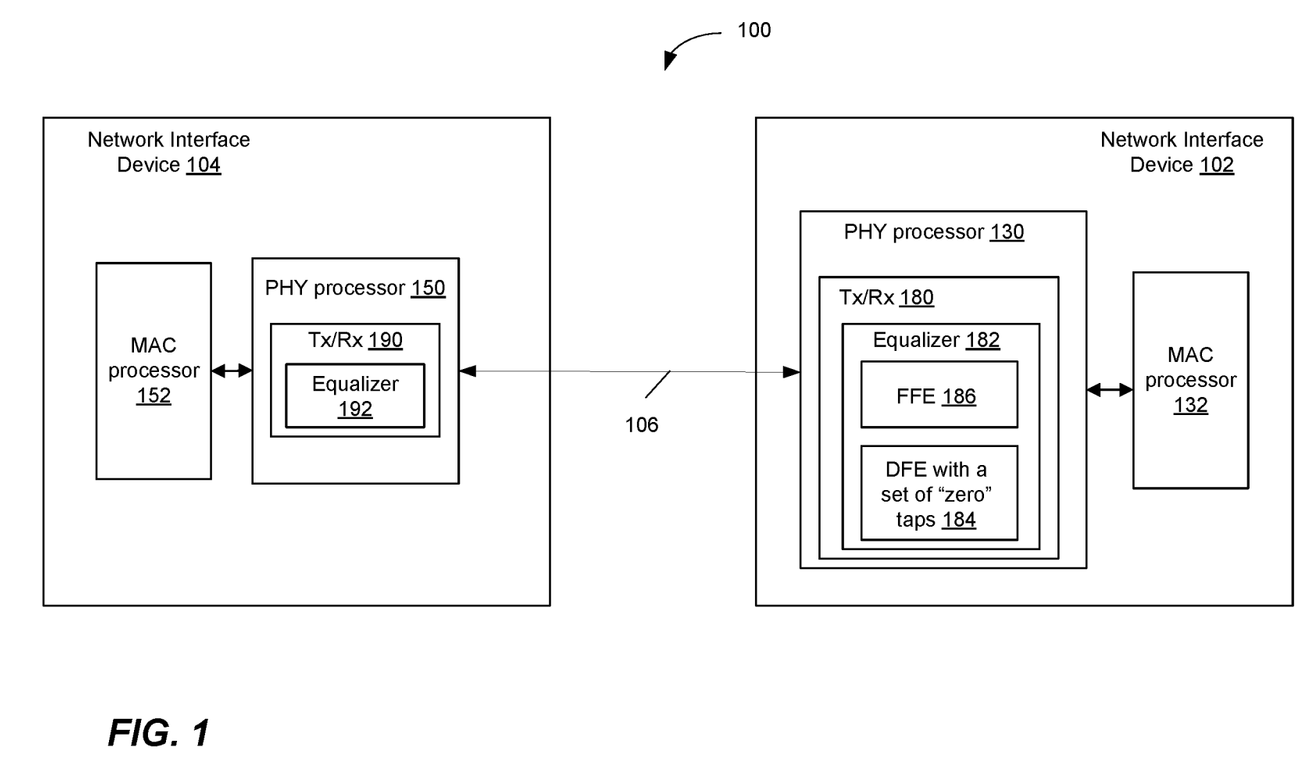
FIG. 1 is a block diagram of an example communication system in which a communication device implements high speed interference mitigation techniques of the present disclosure, according to an embodiment.

FIG. 1 is a block diagram of an example system 100 in which a transceiver device utilizes a DFE in which a set of filter taps are effectively set to zero to enable operation of the DFE at high speeds, such as greater than 1 GHz speeds, according to an embodiment. The system 100 includes a first network interface device 102 coupled to a second network interface device 104 via a network link 106. The first network interface device 102 and the second network interface devices 104 are associated with electronic devices of an automotive network system, in an embodiment. As just an example, the first network interface device 102 is associated with an accessory device, such as a camera or a telematics radio device, in an automobile and the second network interface device 104 is associated with a central processing unit in the automobile, in an embodiment. In other embodiments, the first network interface device 102 and/or the second network interface device 104 are associated with other suitable electronic devices in an automobile, such as an infotainment device, a sensor device, a control device, etc. in the automobile. The network link 106 between the network interface device 102 and the network interface device 104 comprises a single twisted pair copper link, in an embodiment. In another embodiment, the network link 106 is a suitable link different from a single twisted pair copper link. For example, the network link 106 is a multi-pair copper link, an optical link, a fiber link, a radio frequency plastic waveguide link, etc., in various embodiments. In some embodiments, the first network interface device 102 and the second network interface device 104 are utilized in networks other than an automotive network. For example, in some embodiments, the first network interface device 102 and the second network interface device 104 are utilized in an industrial or process industry network.

The network interface device 102 includes one or more physical layer (PHY) processors 130 (sometimes referred to herein as "the PHY processor 130" for brevity). The PHY processor 130 includes a transceiver 180 configured to transmit and receive signals over the link 106. The network interface device 102 also includes one or more media access control (MAC) processors 132 (sometimes referred to herein as "the MAC processor 132" for brevity) coupled to the PHY processor 130, in an embodiment. In another embodiment, the network interface device 102 omits the MAC processor 132. For example, the MAC processor 132 is external to the network interface device 102, in an embodiment.

The network interface device 102 is implemented using one or more integrated circuits (ICs) configured to operate as discussed below. For example, the PHY processor 130 may be implemented, at least partially, on a first IC, and the MAC processor 132 may be implemented, at least partially, on a second IC. As another example, at least a portion of the PHY processor 130 and at least a portion of the MAC processor 132 may be implemented on a single IC. For instance, the network interface device 102 may be implemented using a system on a chip (SoC), where the SoC includes at least a portion of the PHY processor 130 and at least a portion of the MAC processor 132.

The transceiver 180 of the PHY processor 130 includes an equalizer 182, in an embodiment. The equalizer 182 includes a decision feedback equalizer (DFE) 184. The equalizer 180 additionally includes a forward feed equalizer (FFE) 186, in an embodiment.

With continued reference to FIG. 1, the network interface device 104 includes one or more physical layer (PHY) processors 150 (sometimes referred to herein as "the PHY processor 150" for brevity). The PHY processor 150 includes a transceiver 190 configured to transmit and receive signals over the link 106. The network interface device 104 also includes one or more media access control (MAC) processors 152 (sometimes referred to herein as "the MAC processor 152" for brevity) coupled to the PHY processor 150, in an embodiment. In another embodiment, the network interface device 104 omits the MAC processor 152. For example, the MAC processor 152 is external to the network interface device 104, in an embodiment.

The network interface device 104 is implemented using one or more integrated circuits (ICs) configured to operate as discussed below. For example, the PHY processor 150 may be implemented, at least partially, on a first IC, and the MAC processor 152 may be implemented, at least partially, on a second IC. As another example, at least a portion of the PHY processor 150 and at least a portion of the MAC processor 152 may be implemented on a single IC. For instance, the network interface device 104 may be implemented using a system on a chip (SoC), where the SoC includes at least a portion of the PHY processor 150 and at least a portion of the MAC processor 152.

The transceiver 190 of the PHY processor 150 includes an equalizer 192, in an embodiment. The equalizer 192 of the transceiver 190 is the same or similar to is the equalizer 182 of the transceiver 180, in an embodiment. The equalizer 182 includes a DFE (not shown) that is the same is or similar to the DFE 184, in an embodiment. The equalizer 182 also includes an FFE that is the same as or similar to the FFE 186, in an embodiment.

Referring still to FIG. 1, the DFE 184 of the equalizer 182 includes a multi-tap feedback filter (e.g., a finite impulse response (FIR) filter, an infinite impulse response (IIR)— filter, or another suitable type of multi-tap filter), with respective filter taps of the feedback filter corresponding to symbols detected during multiple previous clock cycles, in an embodiment. To enable operation of the DFE 184 at sufficiently high speeds, a set of one or more filter taps of the multi-tap filter corresponding to symbols detected during more recent clock cycles are intentionally not implemented as "filter taps" or, effectively, are forced to be "zero" filter taps, such that ultimately this set of one or more filter taps is not used for generating a filter output during a current clock cycle. Thus, in an embodiment, during a particular clock cycle, the feedback filter generates a filter output based on i) a first set of one or more data symbols detected by the slicer during first one or more previous clock cycles and ii) a second set of one or more data symbols detected by the slicer during second one or more previous clock cycles, wherein the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols. This effective zeroing out of filter taps eases timing constraints for the following filter taps that are used in generating the filter output in the current clock cycle, thereby allowing for the DFE to support higher speeds than possible in traditional DFEs in which all filter taps are used for generating the filter output during a particular clock cycle.

Figure 2:
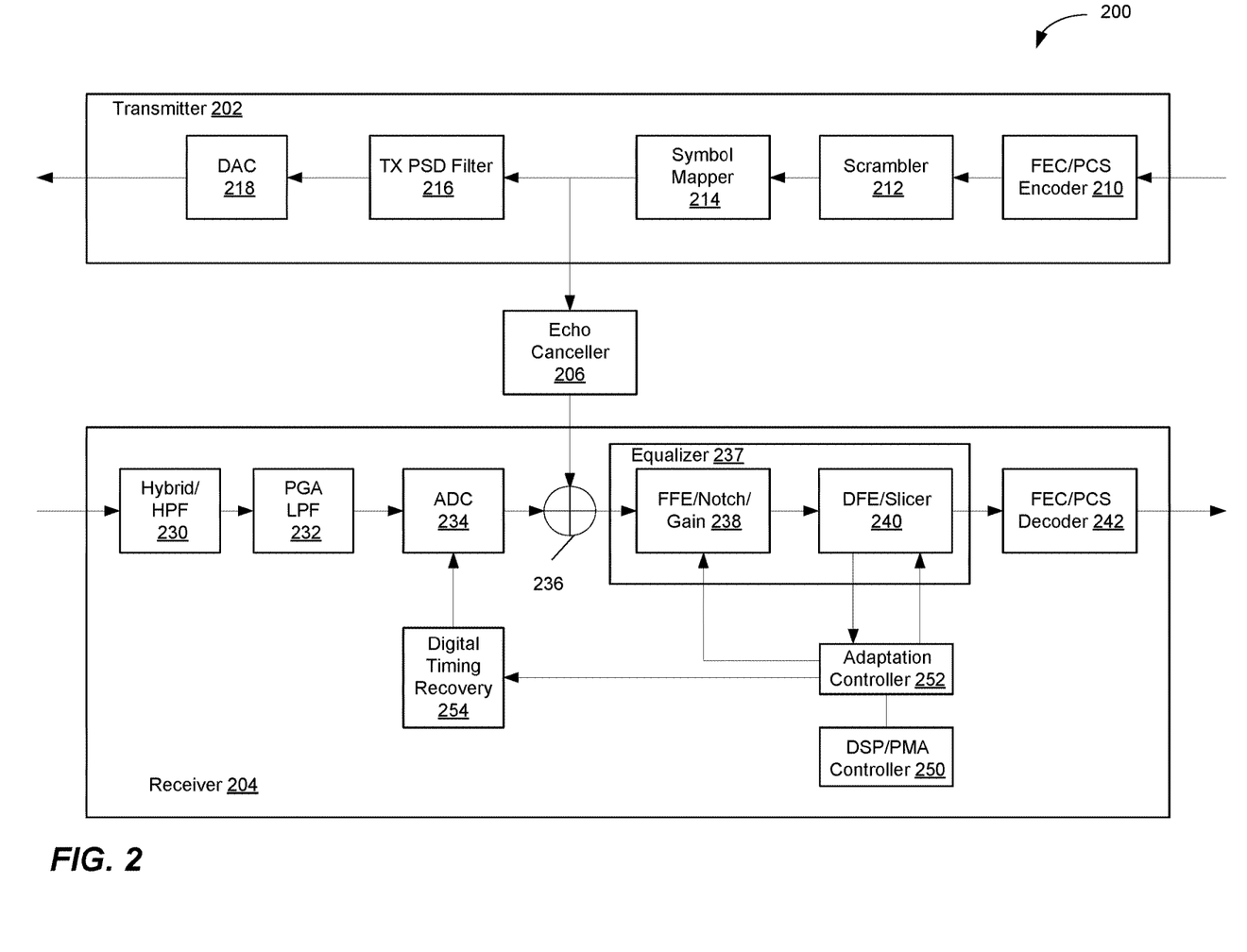
FIG. 2 is a block diagram of an example transceiver device utilized with the communication device in the communication system of FIG. 1, according to an embodiment.

FIG. 2 is a block diagram of an example transceiver device 200, according to an embodiment. The transceiver 200 is utilized with the first network interface device 102 and/or the second network interface device 104 of the system 100 of FIG. 1, according to an embodiment. For example, the transceiver device 200 corresponds to each of the transceiver 180 and/or the transceiver 190 of FIG. 1, in an embodiment. For ease of explanation, the transceiver device 200 is described with reference to network interface devices 102, 104 of the system 100 of FIG. 1. In other embodiments, the transceiver device 200 is utilized with devices different from the network interface device 102, 104 of the system 100 of FIG. 1 and/or is utilized in systems different from the system 100 of FIG. 1.

The transceiver 200 includes a transmitter 202, a receiver 204 and an echo canceller 206. The transmitter 202 includes a forward error correction (FEC) physical coding sublayer (PSC) encoder 210, a scrambler 212, a symbol mapper 214, a power spectral density (PSD) filter 216 and a digital to analog converter (DAC) 218. The FEC/PSC encoder encodes data to be transmitted using one or more codes, such as Reed-Solomon codes, for example. The scrambler 212 scrambles the encoded data to generate a scrambled encoded data stream. The symbol mapper 214 maps bits of the scrambled encoded data stream to modulation symbols using a modulation technique, such as two-level power amplitude modulation (PAM2) or four-level power amplitude modulation (PAM4), for example, to generate a modulated signal. The PSD filter filters the modulated signal to appropriately shape the modulated signal for transmission, for example to ensure that that the transmitted signal meets power density and emission control requirements. The DAC 218 converts the signal to an analog signal for transmission via the network link 106.

The echo canceller 206 receives the output of the symbol mapper 214 and generates an echo cancellation signal. The receiver 204 utilizes the echo cancellation signal to cancel echo that may be present in signals received by the receiver 204 via the network link 106 of FIG. 1 due to signals being simultaneously transmitted by the transmitter 202 via the network link 106, in an embodiment.

The receiver 204 includes a hybrid and high pass filter (HPF) 230, a low pass filter (LPF) 232, an analog to digital converter (ADC) 234, a combiner 236, an equalizer 237 including an FFE 238 and a DFE 240, and an FEC/PCS decoder 242. The hybrid/HPF 230 applies high pass filtering and hybrid frequency compensation to a received signal. The LPF 232 applies low pass filtering to the received signal to attenuate or remove out-of-band high frequency components of the received signal. The ADC 234 converts the filtered received signal to a digital signal. The combiner 236 combines the digital signal with the output of the echo canceller 206 and provides an echo cancelled signal to the equalizer 237. The equalizer 237 equalizes the signal to reverse channel effects and remove interference from the signal, and to detect transmitted symbols in the signal. In an embodiment, the equalizer 237 is configured to generate notch filters to mitigate narrow band EMI. For example, when EMI is detected in a signal, coefficients of the FFE 238 are adapted to generate a notch at a frequency of narrow band interference in the signal. Coefficients of the DFE 240 are, in turn, adapted to equalize the channel with the notch filter and to counter effects of the notch filter, in an embodiment.

The FEC/PCS decoder 242 demodulates and decodes the signal using one or more codes, such as Reed-Solomon codes, for example.

The receiver 204 also includes a digital signal processing (DSP) physical medium attachment (PMA) controller 250, an adaptation controller 252, and a digital timing recovery processor 254. The DSP/PMA controller 250 and the adaptation controller 250 control various aspects of operation of the receiver 104. The adaptation controller 252 is configured to control components of the equalizer 237 to quickly adapt to the communication channel and to remove interference caused by the communication channel. In an embodiment, when EMI is detected in the signal, the adaptation controller 252 controls the equalizer 237 to quickly adapt its coefficients to the mitigate narrow-band EMI interference. The adaptation controller 252 detects presence of EMI in the signal based on an error signal that the adaptation controller receives from the DFE 240, for example. The adaptation controller 252 controls the rate of adaptation of the coefficients of the FFE 238 and the DFE 240 based on a size of the error, in an embodiment. For example, when the error size increases, this indicates presence of EMI interference in the channel, and the adaptation controller 252 controls the FFE 238 and the DFE 240 to increase the rate of adaptation of coefficients of the FFE 238 and the DFE 240 so that the equalizer 237 quickly adapts to mitigate the EMI, in an embodiment.

Figure 3:
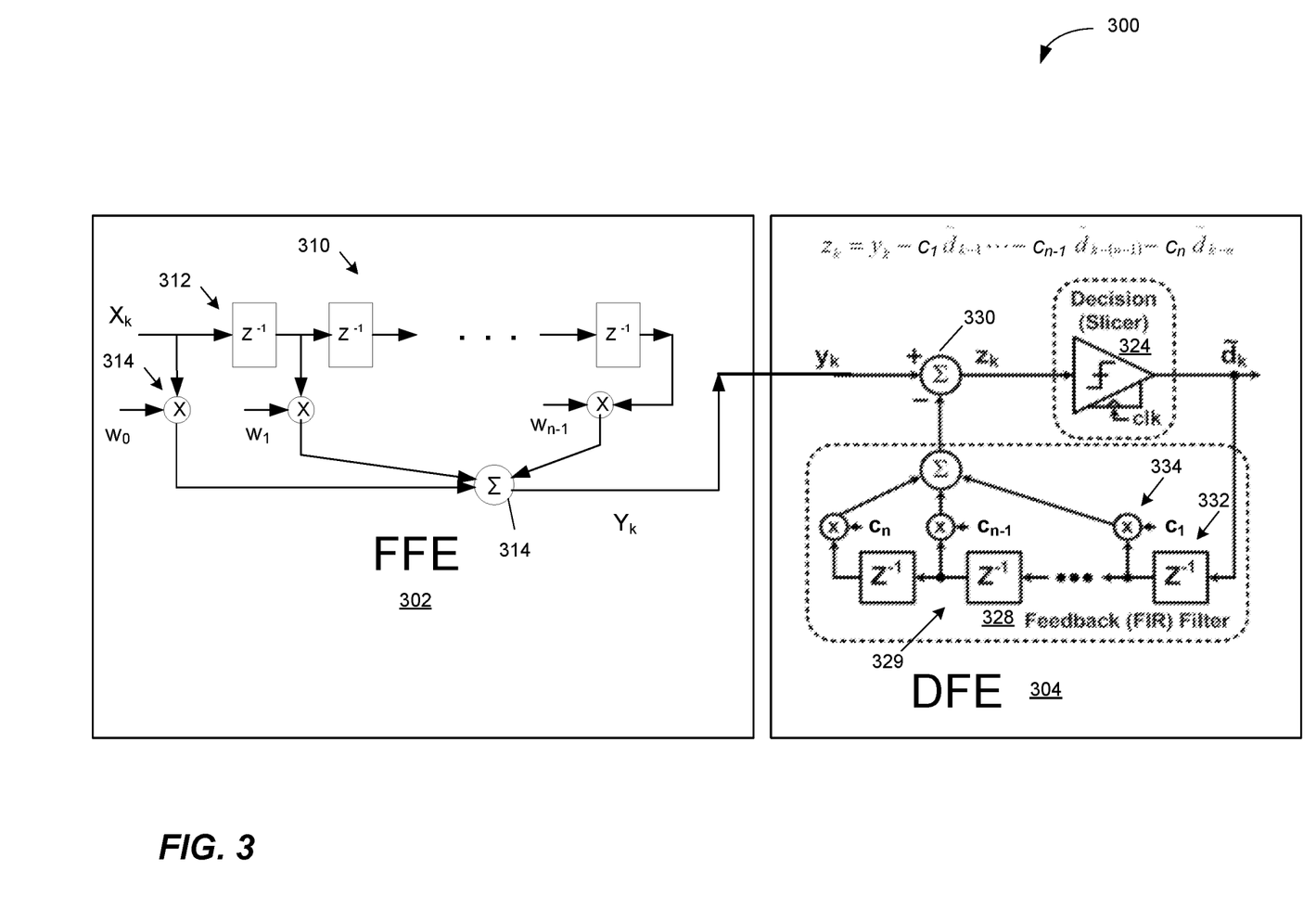
FIG. 3 is a block diagram of an example equalizer utilized with the transceiver device of FIG. 2, according to an embodiment.

FIG. 3 is a block diagram of an example equalizer 300, according to an embodiment. The equalizer 300 is utilized with the first network interface device 102 and/or the second network interface device 104 of the system 100 of FIG. 1 and/or with the transceiver device 200 of FIG. 2, according to an embodiment. For example, the equalizer 300 corresponds to the equalizer 182 of FIG. 1 and/or the equalizer 237 of FIG. 2, in an embodiment. The equalizer 300 is utilized with devices different from the network interface device 102, 104 of FIG. 1 and/or the transceiver device 200 of FIG. 2, in other embodiments.

The equalizer 300 includes an FFE 302 and a DFE 304. The FFE 302 comprises a finite impulse response (FIR) filter having a plurality of filter taps 310, in an embodiment. Each filter tap 310 is implemented as a delay element 312 and a multiplier 314, in an embodiment. Each filter tap 310 utilizes a corresponding coefficient $w_i$. In operation, the FFE 302 adjusts the values of the coefficient $w_i$ to adapt the response of the FIR to the communication channel. In an embodiment, the FFE is configured to adjust the values of the coefficient $w_i$ to generate a notch at a frequency of EMI present in the communication channel, and to mitigate the EMI from the signal received from the communication channel.

The DFE 304 includes a slicer 324, a feedback filter 328 and a summation junction 330. The slicer 324 is configured to make symbol decisions based on an equalized input signal from the FFE 302. During each clock cycle of the DFE 304, the slicer 324 makes a symbol decision based on a signal provided to the input to the slicer 324, in an embodiment. The symbol decisions made by the slicer 324 are fed back to the feedback filter 328. The feedback filter 328 is configured to generate a filter output based on the symbols fed back from the slicer 324. The feedback filter 328 comprises a plurality of filter taps 329, in an embodiment. The filter taps 329 include delay elements 332 and multipliers 334, in an embodiment. Generally, the delay elements 332 store a decisions made by the slicer 324 during particular previous clock cycles, and multipliers 334 multiple the decisions stored in the delay elements 332 by respective coefficients $c_i$.

Each filter tap 329 operates on a particular previous decision made by the slicer 324, in an embodiment. Thus, for example, a first filter tap 329 operates on the decision made by the slicer 324 during the clock cycle that immediately precedes the current clock cycle, a second filter tap 329, having an input coupled to the output of the first filter tap 329, operates on the decision made by the slicer 324 two clock cycles before the current clock cycle, a third filter tap 329, having an input coupled to the output second filter tap 329, operates on the decision made by the slicer 324 three clock cycles before the current clock cycle, and so on, in an embodiment. In an embodiment, the feedback filter 328 comprises 24 filter taps corresponding to decisions made by the slicer 324 during 24 consecutive clock cycles preceding the current clock cycle. In another embodiment, the feedback filter 328 comprises a suitable number of filter taps different from 24 filter taps.

Generally, at high speeds in traditional DFEs, it is difficult to close timing on filter taps that correspond to decisions made by a slicer during one or more most recent clock cycles immediately preceding the current clock cycle. For example, at high speeds, multipliers of the filter taps that operate on the decisions made by the slicer during one or more most recent clock cycles immediately preceding the current clock cycle cannot settle during the current clock cycle. In other words, it is difficult or impossible to "close timing" of the filter taps at high speeds. In an embodiment, to relax requirements to close timing for filter taps 329, one or more filter taps 329 of the DFE 304 are "not implemented" as traditional filter taps. For example, each of such more or more filter taps 329 is implemented as including only the delay element 329, and omitting the multiplier 334. Accordingly, each of such one or more filter taps 329 is effectively intentionally forced to have a "zero" coefficient $c_i$. As an example, filter taps 4 through 7 of the feedback filter 328 are not implemented as traditional filter taps, in an embodiment. According, values of the coefficients $c_4$ through $c_7$ are effectively intentionally set to zeros, in this embodiment. In another embodiment, another suitable set of filter taps 329 of the feedback filter 328 are not implemented as traditional filter taps and do not perform coefficient multiplications. Because a set of one or more filter taps 329 are not implemented as traditional filter taps, and do not perform coefficient multiplications, the requirement to close timing for the following filter taps 329 (e.g., filter taps 8 through 24) is relaxed in the DFE 304, allowing the DFE 304 to efficiently operate with higher speeds than would be possible in a system in which all of the filter taps are implemented, in at least some embodiments. These and other techniques that enable efficient operation of the DFE 304 at high speeds, according to some embodiments, are described in more detail below.

Figure 4:
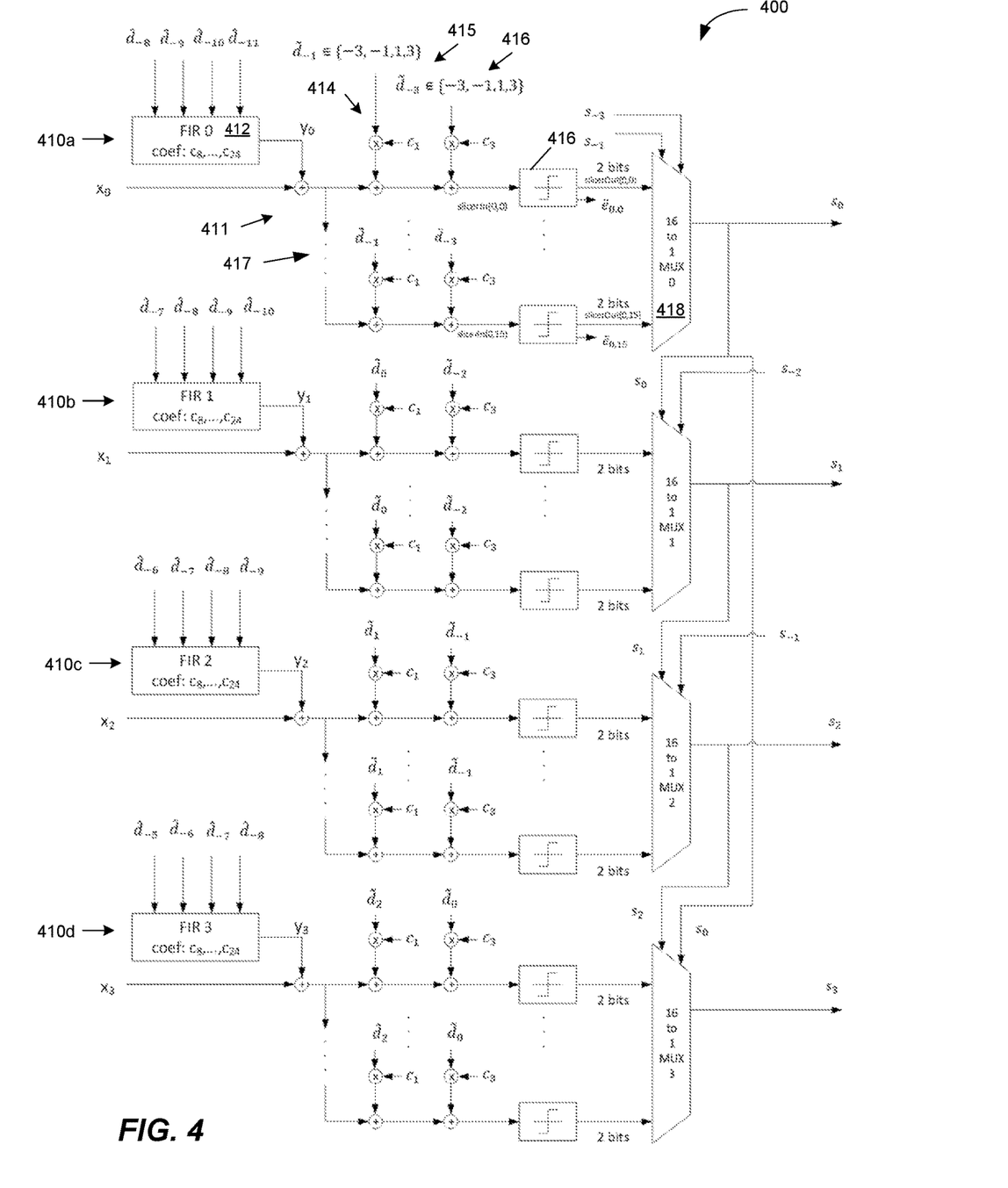
FIG. 4 is a block diagram of an example decision feedback equalizer (DFE) utilized with the equalizer of FIG. 3, according to an embodiment.

FIG. 4 is a block diagram of an example DFE 400, according to an embodiment. The DFE 400 is utilized with the first network interface device 102 and/or the second network interface device 104 of the system 100 of FIG. 1 and/or with the transceiver device 200 of FIG. 2 and/or the equalizer 300 of FIG. 3, according to an embodiment. For example, the DFE 400 corresponds to the DFE 184 of FIG. 1 and/or the DFE 240 of FIG. 2 and/or the DFE 304 of FIG. 3, in an embodiment. The DFE 400 is utilized with devices different from the network interface device 102, 104 of FIG. 1 and/or the transceiver device 200 of FIG. 2 and/or the equalizer 300 of FIG. 3, in other embodiments.

In another embodiment, the DFE 400 includes a suitable number of paths different from four parallel paths. The DFE 400 is configured to operate with PAM 4 modulation at 5.625 G symbols per second, in an embodiment. In other embodiments, the DFE 400 is configured to operate with suitable modulations different from PAM 4 modulation and/or with speeds different from 5.625 G symbols per second.

The DFE 400 includes four parallel paths 410, in an embodiment. Accordingly, the DFE 400 operates at a clock rate that is ¼ of the symbol rate, in this embodiment. As just an example, in an embodiment in which the symbol rate is 5.625 G symbols per second, the DFE 400 operates with 1.40625 GHz. In other embodiments, the DFE 400 includes a number N of parallel paths 410 that is different from four parallel paths, and the DFE operates at a clock rate that is a fraction 1/N of the symbol rate. The parallel paths 410 include a first path 410a configured to process a sample $x_0$ of the input signal, a second path 410b configured to process a sample $x_1$, a third path 410c configured to process a sample $x_3$ of the input signal, and a fourth path 410d configured to process a sample $x_4$ of the input signal, in the illustrated embodiment. Each of the paths 410 includes a respective feedback filter 411, a respective set of slicers 416, and a respective multiplexer 418, in an embodiment. Generally, each path 410 is configured to generate an $i_{th}$ symbol decision $s_i$ based on the input sample $x_i$ equalized using previously detected symbols s either directly (e.g., in the case of multiplexer selection signals) or mapped to corresponding data symbols $\hat{d}$. The path 410a, according to an embodiment, is described in more detail below. The paths 410b-410d are generally the same as the path 410a, in an embodiment, and the paths 410b-410d are generally not described below for purpose of conciseness.

In an embodiment, the parallel path 410a includes a feedback filter 411 which, in turn, an FIR portion 412 and an unrolled filter tap portion 414. The FIR portion 412 implements a set of filter taps associated with respective filter coefficients c. For example, the FIR portion 412 implements 17 filter taps associated with respective filter coefficients $c_8$-$c_{24}$, with filter taps $c_4$-$c_7$ being effectively forced to zero, in an embodiment. During each clock cycle, the FIR portion 412 receives four data symbols and generates an FIR filter output based on the four received data symbols and additional previously received data symbols. In the illustrated embodiment, during a particular clock cycle 0, the FIR portion 412 receives data symbols $\hat{d}_{-8}$, $\hat{d}_{-9}$, $\hat{d}_{-10}$, and $\hat{d}_{-8}$, with the subscript representing the number of preceding clock cycles between the current clock cycle 0 and the clock cycle during which the corresponding symbol decision was made, in an embodiment. Thus, for example, the data symbol $\hat{d}_{-8}$ corresponds to the decision that was made eight clock cycles before the current clock cycle. Accordingly, because the coefficients $c_4$-$c_7$ to zero are effectively forced to zero, the "most recent" decision used for calculations performed by the FIR portion 412 during the current clock cycle was made eight clock cycles before the current clock cycle, in this embodiment. Thus, effectively forcing the coefficients $c_4$-$c_7$ to zero relaxes requirements to close timing on calculation performed by the remaining filter taps $c_8$-$c_{24}$, in an embodiment.

The unrolled filter tap portion 414 includes a first filter tap portion 415 and a third filter tap portion 416, respectively associated with the coefficients $c_1$ and $c_3$, of the feedback filter 411, in an embodiment. A filter tap portion associated with the second coefficient $c_2$ of the feedback filter 411 is not implemented in the feedback filter 411, in an embodiment. In other words, the value of the coefficient $c_2$ is effectively forced to zero, in this embodiment. Effectively setting the coefficient $c_2$ to zero allows the unrolled filter tap portion 414 to be implemented more efficiently and with less hardware (e.g., smaller silicon area) as compared to systems that do not intentionally set any unrolled filter tap coefficients to zero, in an embodiment.

In an embodiment, the unrolled filter tap portion 414 pre-calculates, in parallel branches 417, equalized outputs of the feedback filter 411 with all possible combinations of values of the data symbol corresponding to the filter tap $c_1$ and the data symbol $\tilde{d}_{-3}$ corresponding to the filter tap $c_3$. In general, the values of each of the data symbol $\tilde{d}_{-1}$ and the data symbol $\tilde{d}_{-3}$ are selected from a set of a plurality of possible values depending on a particular modulation of the signal being equalized. As an example, in an embodiment in which PAM4 modulation is utilized, the values of each of the data symbol $\tilde{d}_{-1}$ and the data symbol $\tilde{d}_{-3}$ are selected as two values from a set of four values corresponding to four possible modulation levels, such as {3, −1, 1, 3}, for example. Different possible combinations of the values of the data symbols $\tilde{d}_{-1}$, $\tilde{d}_{-3}$ are selected for different ones of the parallel branches 417, in an embodiment. Respective equalized outputs are generated in the parallel branches 417 by adding i) a sum of a) a sample of the input signal $x_i$ at the input to the DFE and b) the output $y_i$ of the FIR portion with ii) the result of the $c_1*\tilde{d}_{i-1}+c_3*\tilde{d}_{i-3}$ performed in the respective branches 417 of the unrolled filter tap portion 414. The respective equalized outputs of the feedback filter 411 are provided to respective slicers 430, in an embodiment. The slicers 430, accordingly, generate decisions based on slicer inputs $k_i=x_i+y_i+c_1*\tilde{d}_{i-1}+c_3*\tilde{d}_{i-3}$, in an embodiment. The respective slicers 430 output corresponding data symbol decisions, which are provided as inputs to the multiplexer 418. Subsequently, when the actual decisions regarding the data symbol $\hat{d}_{-1}$ and $\tilde{d}_{-3}$, corresponding to the detected symbols $s_{-1}$ and $s_{-3}$ are available, these decisions are used as control signals to the multiplexer 418 to select the appropriate output of the feedback filter 411, in an embodiment.

With continued reference to FIG. 4, in a particular clock cycle, the DFE 400 generates respective symbol decisions din respective ones of the parallel paths 410. Thus, the DFE 400 generates four symbol decisions din a particular clock cycle, in the illustrated embodiment. In an embodiment in which PAM4 modulation is utilized, $i_{th}$ symbol decision having possible values {3, −1, 1, 3} is mapped to a non-negative symbol s according to a mapping $s_i=\frac{1}{2}(\hat{d}_1+3)$. Accordingly, in this embodiment, the symbol $s_i$ has a non-negative value of the set of values {0, 1, 2, 3}. In other embodiments, other suitable mappings to map $\hat{d}_i$ to non-negative $s_i$ are utilized. In an embodiment, the slicers 416 generate symbols decisions based on slicer inputs $k_i=x_i+y_i+c_1*\tilde{d}_{i-1}+c_3*\tilde{d}_{i-3}$ according to:

$$T(i,\tilde{d}_{i-1},\tilde{d}_{i-3})=0, \text{ if } k_i<-2,$$

$$T(i,\tilde{d}_{i-1},\tilde{d}_{i-3})=1, \text{ if } -2\leq k_i<0$$

$$T(i,\tilde{d}_{i-1},\tilde{d}_{i-3})=2, \text{ if } 0\leq k_i<2$$

$$T(i,\tilde{d}_{i-1},\tilde{d}_{i-3})=3, \text{ if } k_i\geq 2 \qquad \text{Equation 1}$$

In other embodiments, the decisions are generated in other suitable manners.

Referring still to FIG. 4, in an embodiment, the DFE 400 is configured to (or an adaptation controller, such as the adaptation controller 252 is configured to) adapt filter tap coefficients c based on slicer error generated by the slicers 430, in an embodiment. In an embodiment, for a decision generated by a $j_{th}$ slicer 430 during a particular clock cycle, the $j_{th}$ slicer 430 generates a slicer error according to:

$$\tilde{e}_{0,j} = \text{slicerIn}(0,j) - \text{slicerOut}(0,j) \quad \text{Equation 2}$$

where slicerIn(0,j) is the signal at the input to the $j_{th}$ slicer 430 during the particular clock cycle and slicerOut(0,j) is the signal at the output of the $j_{th}$ slicer 430 during the particular clock cycle. The filter coefficients are adapted once in every clock cycle, in an embodiment. In an embodiment, the coefficient values for the clock cycle m+1 are calculated, using least mean square (LMS) calculations based on the coefficient values used in the clock cycle m and the errors according to:

$$c^{m+1}(n) = c^m(n) - \mu(n) \Sigma_{l=n}^{n+3} \hat{d}_{l-n} e_l \quad \text{Equation 3}$$

where n is the filter coefficient index (or, equivalently, the filter tap index), $\mu(n)$ is an LMS step size, and $e_l$ is the error generated by the slicer 430 corresponding to the output signal selected by the multiplexer 418 in the path 410 that generates the decision $\hat{d}_{l-n}$ during the particular clock cycle. In other embodiments, the filter coefficients are updated based on errors generated by the slicers 430 in other suitable manners. For example, the filter coefficients are updated using calculation other than LMS calculations, in some embodiments.

Figure 5:
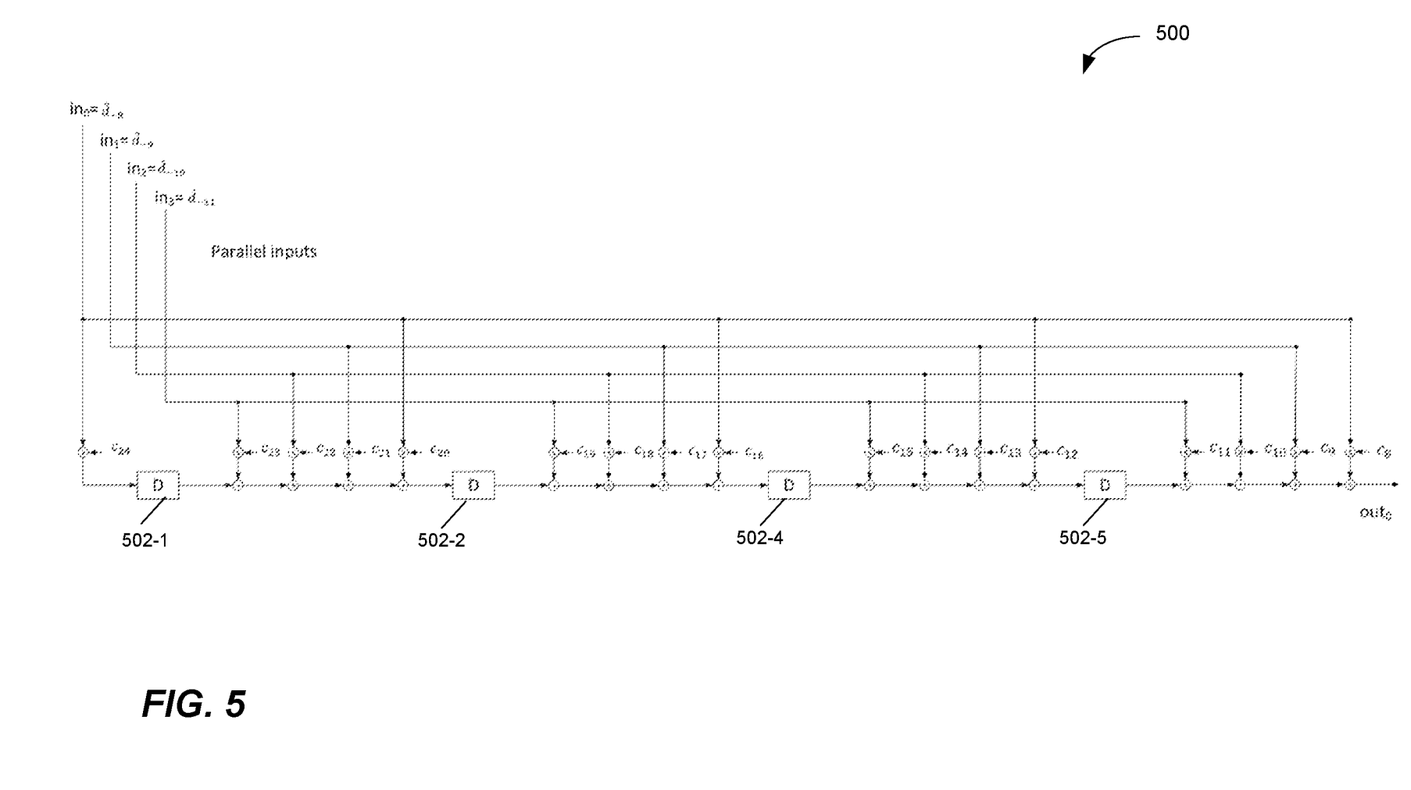
FIG. 5 is a block diagram of an example finite impulse response (FIR) filter utilized with the DFE of FIG. 4, according to an embodiment.

FIG. 5 is a block diagram of an example FIR portion 500, according to an embodiment. The FIR portion 500 corresponds to the FIR portion 412 of the DFE 400 of FIG. 4, in an embodiment. The FIR portion 500 is utilized with DFEs different from the DFE 400 of FIG. 4, in other embodiments. The FIR portion 500 is configured to, during each clock cycle, receive four parallel inputs $in_o$-$in_4$, and generate a single output $out_0$, in the illustrated embodiment. In operation, the parallel inputs $in_o$-$in_4$ are multiplied by respective coefficients c, and the sums are stored in respective delay elements 502. Each delay element D 502 generally stores a sum of four previous data symbols multiplied by respective filter tap coefficients. Accordingly, each delay element D2 502 provides a delay of four clock cycles, in an embodiment.

Figure 6A:
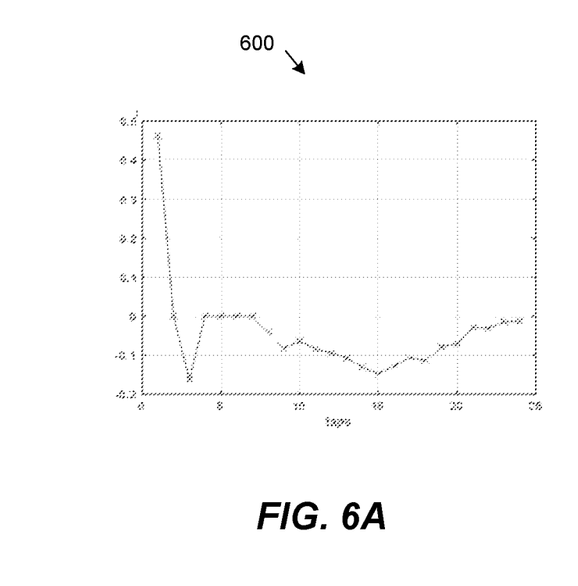
FIGS. 6A-B are diagrams of example DFE coefficients utilized with the DFE of FIG. 4, according to embodiments.
Figure 6B:
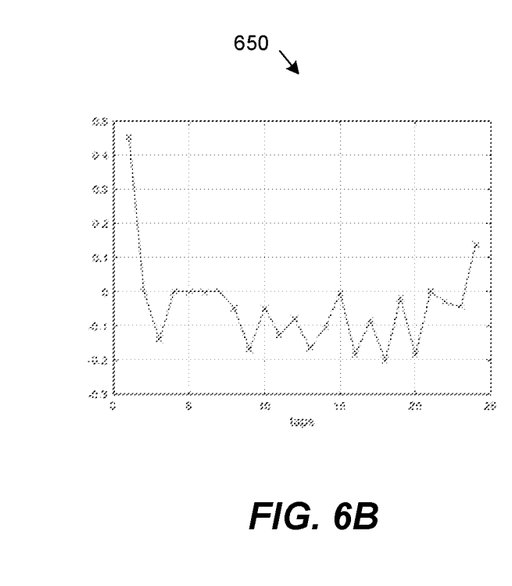

FIGS. 6A-B are diagrams of example coefficients 600, 650 of a feedback filter of a DFE, according to embodiments. In the plots 600, 650, the x-axis illustrates filter taps of the feedback filter, and the y-axis illustrates values of the coefficients c of the feedback filter. In an embodiment, the DFE coefficients 600, 650 are utilized with the DFE 400 of FIG. 4. In other embodiments, the coefficients 600, 650 are utilized with feedback filters of DFEs different from the DFE 400 of FIG. 4. The coefficients 600, 650 are adapted to equalize an input signal from an FFE that is coupled to an input of the DFE, in an embodiment.

Referring first to FIG. 6A, the plot 600 illustrates example coefficients of the feedback filter of the DFE in absence of EMI interference in the communication channel. The coefficient values $c_2$ and $c_4$-$c_7$ are zeros of the feedback filter, in an embodiment. For example, the filter taps corresponding to the coefficient $c_2$ and $c_4$-$c_7$ are not implemented, effectively forcing the values of the coefficients $c_2$ and $c_4$-$c_7$ to zero, as discussed above, in an embodiment. Referring now to FIG. 6B, the plot 650 illustrates example coefficients of the feedback filter of the DFE when EMI interference is present in the communication channel. The coefficient values $c_2$ and $c_4$-$c_7$ of the feedback filter remain zeros, in an embodiment. The plot 650 illustrates coefficients $c_8$-$c_{24}$ of the feedback filter that are adapted to counter a notch filter generated by the FFE, according to an embodiment.

Figure 7:
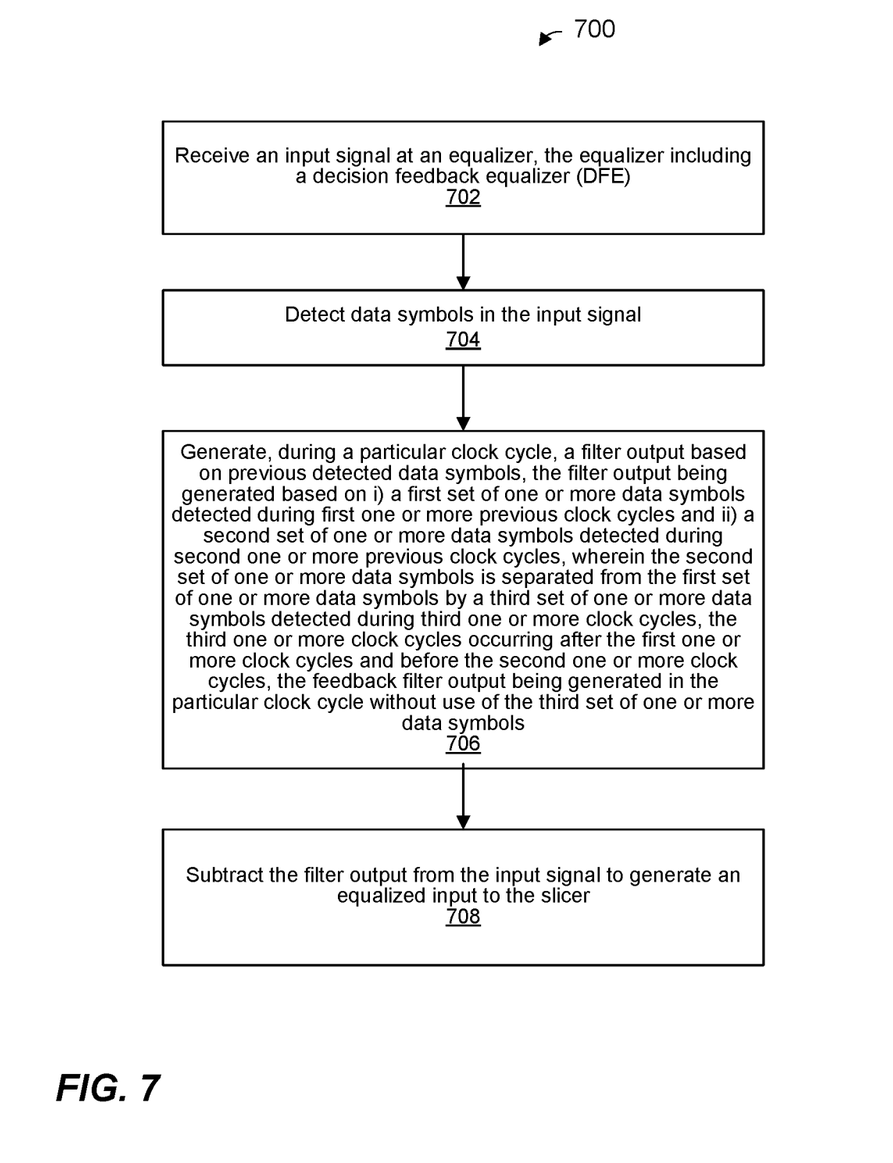
FIG. 7 is a flow diagram of an example method for mitigating interference in signals received by a transceiver device in an automotive Ethernet network, according to an embodiment.

FIG. 7 is a flow diagram of an example method 700 for mitigating interference in signals received by a transceiver device in an automotive Ethernet network, according to an embodiment. The method 700 is implemented by the PHY processor 150 of the network interface device 102 of the system of FIG. 1, in an embodiment. In other embodiments, method 700 is implemented by another suitable communication device (e.g., the network interface device 104) of the system 100 of FIG. 1 or is implemented in a suitable system different from the system 100 of FIG. 1.

At block 702, an input signal is received. The input signal at block 702 is received at an input of an equalizer of the transceiver device, in an embodiment. For example, the input signal is received at an input of the equalizer 182 of the network interface device 102 of FIG. 1, in an embodiment. In another embodiment, the input signal is received at an equalizer different from the equalizer 182 and/or at an equalizer of a suitable communication device different from the network interface device 102 of FIG. 1. The equalizer includes at least a DFE, in an embodiment. The equalizer additionally includes an FFE, in an embodiment.

At block 704, data symbols are detected based on the input signal received at block 702. In an embodiment, the data symbols are detected by a slicer of the DFE. In another embodiment, the data symbols are detected in suitable manners different from a slicer of the DFE.

At block 706 a filter output of a feedback filter of the DFE is generated based on data symbols detected at block 704. In an embodiment, during a particular clock cycle, the filter output at block 706 is generated based on data symbols detected at block 704 during a plurality of previous clock cycles that preceded the particular clock cycles. In an embodiment, the filter output is generated, during the particular clock cycles, based on i) a first set of one or more data symbols detected by the slicer during first one or more previous clock cycles and ii) a second set of one or more data symbols detected by the slicer during second one or more previous clock cycles. The second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols, in an embodiment.

At block 708, the filter output generated at block 796 is subtracted from the input signal to generate an equalized input to the slicer.

In an embodiment, a transceiver device for use in an automotive Ethernet network. The transceiver device comprises: an equalizer configured to mitigate interference in an input signal received by the transceiver device, the equalizer including a decision feedback equalizer (DFE) including a slicer configured to detect data symbols in the input signal, a feedback filter configured to, during a particular clock cycle, generate a filter output based on i) a first set of one or more data symbols detected by the slicer during first one or more previous clock cycles and ii) a second set of one or more data symbols detected by the slicer during second one or more second previous clock cycles, wherein the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols, and a summing junction configured to subtract the filter output from the input signal to generate an equalized input to the slicer.

In other embodiments, the transceiver device also comprises one of, or any suitable combination of two or more of, the following features.

The feedback filter comprises a plurality of filter taps including at least a first set of filter taps, wherein the first set of filter taps includes at least a first filter tap, a second filter tap and a third filter tap.

The first filter tap and the third filter tap are implemented as unrolled filter taps configured to perform a plurality of pre-calculations to determine a plurality of filter outputs corresponding to a plurality of possible data symbol values for the first filter tap and the second filter tap, wherein a particular filter output, among the plurality of filter outputs, is selected based on actual data symbols detected by the slicer during a first previous clock cycle and a second previous clock cycle, and wherein the second filter tap stores a value corresponding to a data symbol detected by the slicer during a third clock cycle that occurs after the first clock cycle and before the second clock cycle, wherein the second data symbol is not used by the feedback filter in generating the filter output during the particular clock cycle.

The first previous clock cycle immediately precedes the particular clock cycles, The second previous clock cycle occurs two clock cycles before the particular clock cycle.

The feedback filter further includes a second set of filter taps, the second set of filter taps including one or more filter taps configured to store one or more data symbols that are not used by the feedback filter in generating the filter output during the particular clock cycle.

The second set of filter taps further includes one or more additional filter taps configured to process respective data symbols of the second set of one or more data symbols detected by the slicer during the second one or more previous clock cycles.

The DFE comprises a plurality of parallel paths configured to process respective ones of consecutive samples of the input signal.

The slicer is configured to detect a particular data symbol by determining that the particular data symbol corresponds to a particular value in a set of a plurality possible values of the data symbol.

The equalizer further includes a feed forward equalizer (FFE) having an output coupled to the input of the DFE.

The FFE is configured to generate a notch filter to mitigate electromagnetic interference.

The DFE is configured to equalize effects of the notch filter on the input signal.

The transceiver of claim 1 further comprises an adaptation controller configured to, during the particular clock cycle, adapt coefficients of the feedback filter of the DFE based on a slicer error detected by the slicer during a previous clock cycle that immediately precedes the particular clock cycle.

In another embodiment, a method for mitigating interference in signals received by a transceiver device in an automotive Ethernet network. The method includes: receiving an input signal at an equalizer of the transceiver device, the equalizer including a decision feedback equalizer (DFE); detecting, with a slicer of the DFE, data symbols in the input signal; generating a filter output at a feedback filter of the DFE, the filter output being generated, during a particular clock cycle, based on i) a first set of one or more data symbols detected by the slicer during first one or more previous clock cycles and ii) a second set of one or more data symbols detected by the slicer during second one or more previous clock cycles, wherein the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols; and subtracting the filter output from the input signal to generate an equalized input to the slicer.

In other embodiments, the method also includes one of, or any suitable combination of two or more of, the following features.

Generating the filter output comprises generating the filter output using a plurality of filter taps including at least a first set of filter taps and a second set of filter taps.

The first set of filter taps includes at least a first filter tap, a second filter tap and a third filter tap, and wherein generating the filter output comprises generating the filter output using the first filter tap and the third filter tap implemented as unrolled filter taps configured to perform a plurality of pre-calculations to determine a plurality of filter outputs corresponding to a plurality of possible data symbol values for the first filter tap and the second filter tap, wherein a particular filter output, among the plurality of filter outputs, is selected based on actual data symbols detected by the slicer during a first previous clock cycle and a second previous clock cycle, and wherein the method further comprises storing, in the second filter tap value corresponding to a data symbol detected by the slicer during a third clock cycle that occurs after the first clock cycle and before the second clock cycle, wherein the second data symbol is not used by the feedback filter in generating the filter output during the particular clock cycle.

Generating the filter output includes selecting the filter output, among the plurality of filter outputs, using actual data symbols detected by the slicer during i) the first previous clock cycle, wherein the first previous clock cycle immediately precedes the particular clock cycles and ii) the second previous clock cycle, wherein the second previous clock cycle occurs two clock cycles before the particular clock cycle.

The method further comprises storing, in one or more filter taps of the second set of filter taps, one or more data symbols that are not used by the feedback filter in generating the filter output during the particular clock cycle.

Generating the filter output includes processing, using one or more additional filter taps of the second set of filter taps, respective data symbols of the second set of one or more data symbols detected by the slicer during the second one or more previous clock cycles.

Generating the filter output comprises generating the filter output using respective feedback filter portions in respective ones of a plurality of parallel paths of the DFE, respective ones of the parallel paths configured to process respective ones of consecutive samples of the input signal.

Detecting the data symbols in the input signal comprises detecting a particular data symbols by determining that the particular data symbols corresponds to a particular value in a set of a plurality of possible values of the data symbol.

The equalizer further includes a feed forward equalizer (FFE) having an output coupled to the input of the DFE, wherein the method includes: generating, at the FFE, a notch filter to mitigate electromagnetic interference, and equalizing, at the DFE, effects of the notch filter on the input signal.

The method further comprises updating, during the particular clock cycle coefficients of the feedback filter of the DFE based on a slicer error detected by the slicer during a previous clock cycle that immediately precedes the particular clock cycle.

At least some of the various blocks, operations, and techniques described above may be implemented utilizing hardware, a processor executing firmware instructions, a processor executing software instructions, or any combination thereof. When implemented utilizing a processor executing software or firmware instructions, the software or firmware instructions may be stored in any suitable computer readable memory such as a random access memory (RAM), a read only memory (ROM), a flash memory, etc. The software or firmware instructions may include machine readable instructions that, when executed by one or more processors, cause the one or more processors to perform various acts.

When implemented in hardware, the hardware may comprise one or more of discrete components, an integrated circuit, an application-specific integrated circuit (ASIC), a programmable logic device (PLD), etc.

While the present invention has been described with reference to specific examples, which are intended to be illustrative only and not to be limiting of the invention, changes, additions and/or deletions may be made to the disclosed embodiments without departing from the scope of the invention.

What is claimed is:

1. A transceiver device for use in an automotive Ethernet network, the transceiver device comprising:
    an equalizer configured to mitigate interference in an input signal received by the transceiver device, the equalizer including a decision feedback equalizer (DFE) including
        a slicer configured to detect data symbols in the input signal,
        a feedback filter configured to, during a particular clock cycle, generate a filter output based on i) a first set of one or more data symbols detected by the slicer during first one or more previous clock cycles and ii) a second set of one or more data symbols detected by the slicer during second one or more second previous clock cycles, wherein the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols to ease timing constraints for closing timing on the second set of one or more data symbols that is used for generating the feedback filter output in the particular clock cycle, and
        a summing junction configured to subtract the filter output from the input signal to generate an equalized input to the slicer.

2. The transceiver device of claim 1, wherein the feedback filter comprises a plurality of filter taps including at least a first set of filter taps, wherein the first set of filter taps includes at least a first filter tap, a second filter tap and a third filter tap.

3. The transceiver device of claim 2, wherein the first filter tap and the third filter tap are implemented as unrolled filter taps configured to perform a plurality of pre-calculations to determine a plurality of filter outputs corresponding to a plurality of possible data symbol values for the first filter tap and the second filter tap, wherein a particular filter output, among the plurality of filter outputs, is selected based on actual data symbols detected by the slicer during a first previous clock cycle and a second previous clock cycle, and wherein the second filter tap stores a value corresponding to a data symbol detected by the slicer during a third clock cycle that occurs after the first clock cycle and before the second clock cycle, wherein the second data symbol is not used by the feedback filter in generating the filter output during the particular clock cycle.

4. The transceiver device of claim 3, wherein i) the first previous clock cycle immediately precedes the particular clock cycles and ii) the second previous clock cycle occurs two clock cycles before the particular clock cycle.

5. The transceiver device of claim 2, wherein the feedback filter further includes a second set of filter taps, the second set of filter taps including one or more filter taps configured to store one or more data symbols that are not used by the feedback filter in generating the filter output during the particular clock cycle.

6. The transceiver device of claim 5, wherein the second set of filter taps further includes one or more additional filter taps configured to process respective data symbols of the second set of one or more data symbols detected by the slicer during the second one or more previous clock cycles.

7. The transceiver device of claim 1, wherein the DFE comprises a plurality of parallel paths configured to process respective ones of consecutive samples of the input signal.

8. The transceiver device of claim 1, wherein the slicer is configured to detect a particular data symbol by determining that the particular data symbol corresponds to a particular value in a set of a plurality possible values of the data symbol.

9. The transceiver device of claim 1, wherein the equalizer further includes a feed forward equalizer (FFE) having an output coupled to the input of the DFE, wherein:
    the FFE is configured to generate a notch filter to mitigate electromagnetic interference, and
    the DFE is configured to equalize effects of the notch filter on the input signal.

10. The transceiver of claim 1, further comprising an adaptation controller configured to, during the particular clock cycle, adapt coefficients of the feedback filter of the DFE based on a slicer error detected by the slicer during a previous clock cycle that immediately precedes the particular clock cycle.

11. A method for mitigating interference in signals received by a transceiver device in an automotive Ethernet network, the method comprising:
    receiving an input signal at an equalizer of the transceiver device, the equalizer including a decision feedback equalizer (DFE);
    detecting, with a slicer of the DFE, data symbols in the input signal
    generating a filter output at a feedback filter of the DFE, the filter output being generated, during a particular clock cycle, based on i) a first set of one or more data symbols detected by the slicer during first one or more previous clock cycles and ii) a second set of one or more data symbols detected by the slicer during second one or more previous clock cycles, wherein the second set of one or more data symbols is separated from the first set of one or more data symbols by a third set of one or more data symbols detected by the slicer during third one or more clock cycles, the third one or more clock cycles occurring after the first one or more clock cycles and before the second one or more clock cycles, the feedback filter output being generated in the particular clock cycle without use of the third set of one or more data symbols to ease timing constraints for closing timing on the second set of one or more data symbols that is used for generating the feedback filter output in the particular clock cycle; and subtracting the filter output from the input signal to generate an equalized input to the slicer.

12. The method of claim 11, wherein generating the filter output comprises generating the filter output using a plurality of filter taps including at least a first set of filter taps and a second set of filter taps.

13. The method of claim 12, wherein the first set of filter taps includes at least a first filter tap, a second filter tap and a third filter tap, and wherein generating the filter output comprises generating the filter output using the first filter tap and the third filter tap implemented as unrolled filter taps configured to perform a plurality of pre-calculations to determine a plurality of filter outputs corresponding to a plurality of possible data symbol values for the first filter tap and the second filter tap, wherein a particular filter output, among the plurality of filter outputs, is selected based on actual data symbols detected by the slicer during a first previous clock cycle and a second previous clock cycle, and wherein the method further comprises storing, in the second filter tap value corresponding to a data symbol detected by the slicer during a third clock cycle that occurs after the first clock cycle and before the second clock cycle, wherein the second data symbol is not used by the feedback filter in generating the filter output during the particular clock cycle.

14. The method of claim 13, wherein generating the filter output includes selecting the filter output, among the plurality of filter outputs, using actual data symbols detected by the slicer during i) the first previous clock cycle, wherein the first previous clock cycle immediately precedes the particular clock cycles and ii) the second previous clock cycle, wherein the second previous clock cycle occurs two clock cycles before the particular clock cycle.

15. The method of claim 12, further comprising storing, in one or more filter taps of the second set of filter taps, one or more data symbols that are not used by the feedback filter in generating the filter output during the particular clock cycle.

16. The method of claim 15, wherein generating the filter output includes processing, using one or more additional filter taps of the second set of filter taps, respective data symbols of the second set of one or more data symbols detected by the slicer during the second one or more previous clock cycles.

17. The method of claim 1, wherein generating the filter output comprises generating the filter output using respective feedback filter portions in respective ones of a plurality of parallel paths of the DFE, respective ones of the parallel paths configured to process respective ones of consecutive samples of the input signal.

18. The method of claim 11, wherein detecting the data symbols in the input signal comprises detecting a particular data symbol by determining that the particular data symbol corresponds to a particular value in a set of a plurality of possible values of the data symbol.

19. The method of claim 11, wherein the equalizer further includes a feed forward equalizer (FFE) having an output coupled to the input of the DFE, wherein the method includes:

generating, at the FFE, a notch filter to mitigate electromagnetic interference, and equalizing, at the DFE, effects of the notch filter on the input signal.

20. The method of claim 11, further comprising updating, during the particular clock cycle coefficients of the feedback filter of the DFE based on a slicer error detected by the slicer during a previous clock cycle that immediately precedes the particular clock cycle.

* * * * *